(12) United States Patent
Yoshida et al.

(10) Patent No.: US 9,417,123 B2
(45) Date of Patent: Aug. 16, 2016

(54) ILLUMINATION SETTING METHOD, APPARATUS AND COMPUTER-READABLE MEDIUM FOR A BRIGHTNESS TOOL OF AN IMAGE MEASURING APPARATUS

(71) Applicant: MITUTOYO CORPORATION, Kanagawa (JP)

(72) Inventors: Hiroyuki Yoshida, Hiroshima (JP); Satoshi Takafuji, Hiroshima (JP); Naoki Shirai, Hiroshima (JP)

(73) Assignee: MITUTOYO CORPORATION, Kanagawa (JP)

( * ) Notice: Subject to any disclaimer, the term of this patent is extended or adjusted under 35 U.S.C. 154(b) by 1 day.

(21) Appl. No.: 14/271,652

(22) Filed: May 7, 2014

(65) Prior Publication Data

US 2014/0332662 A1 Nov. 13, 2014

(30) Foreign Application Priority Data

May 8, 2013 (JP) .................................. 2013-098899

(51) Int. Cl.
 *G01J 1/32* (2006.01)
(52) U.S. Cl.
 CPC ........................................ *G01J 1/32* (2013.01)
(58) Field of Classification Search
 CPC ..... H04N 3/155; G01J 1/32; G01J 2005/0077
 USPC ............... 250/205, 214 R, 214.1, 221, 208.1; 348/302–311
 See application file for complete search history.

(56) References Cited

U.S. PATENT DOCUMENTS 4,745,272 A * 5/1988 Andreatti, Jr. ........ B07C 5/3416
 250/205
2012/0187275 A1 7/2012 Shirai et al.

FOREIGN PATENT DOCUMENTS

JP 2009-168607 A 7/2009
JP 2012-151714 A 8/2012

* cited by examiner

*Primary Examiner* — Que T Le
(74) *Attorney, Agent, or Firm* — Greenblum & Bernstein, P.L.C.

(57) ABSTRACT

A value of a current corresponding to a relationship between an illumination intensity instruction value and illumination intensity is calculated based on a previously obtained relationship between a current flowing through a light emitting device and the illumination intensity. A calibration table including the illumination intensity instruction value, the calculated value of the current, and the illumination intensity is created. A required illumination intensity is calculated based on exposure time per frame during autofocusing. An illumination intensity instruction value corresponding to the required illumination intensity is calculated using the calibration table. The calculated illumination intensity instruction value is set using the calibration table such that brightness of a measured image remains consistent even when a frame rate is changed.

3 Claims, 9 Drawing Sheets

PRIOR ART

Fig. 3

PRIOR ART

Fig. 4

PRIOR ART

Calibration table

| Illumination intensity instruction value [%] | Current | | Illumination intensity [Lx] |
|---|---|---|---|
| | DAC value | PWM [%] | |
| 0 | 0 | 0 | 0 |
| 1 | 5000 | 20 | 2 |
| 5 | 5000 | 50 | 5 |
| 10 | 5000 | 100 | 10 |
| 20 | 5120 | 100 | 30 |
| 40 | 16384 | 100 | 70 |
| 60 | 18432 | 100 | 160 |
| 80 | 31744 | 100 | 290 |
| 100 | 54272 | 100 | 500 |

Fig. 14

ILLUMINATION SETTING METHOD, APPARATUS AND COMPUTER-READABLE MEDIUM FOR A BRIGHTNESS TOOL OF AN IMAGE MEASURING APPARATUS

CROSS-REFERENCE TO RELATED APPLICATIONS

The present application claims priority under 35 U.S.C. §119 of Japanese Application No. 2013-098899 filed on May 8, 2013, the disclosure of which is expressly incorporated by reference herein in its entirety.

BACKGROUND OF THE INVENTION

1. Field of the Invention

The present invention relates to an illumination setting method, an illumination setting apparatus, and computer-readable medium for a brightness tool of an image measuring apparatus. In particular, the present invention relates to an illumination setting method, an illumination setting apparatus, and computer-readable medium for brightness tool of an image measuring apparatus that identify a measured object by capturing an image of the measure object, the image measuring apparatus being suitable as an image measuring apparatus equipped with a camera and an illumination device, such as a CNC image measurer, an image unit (microscope with a motor drive stage), a hardness tester, and an image probe of a CNC three-dimensional measurer. The computer software for brightness tool sets illumination such that brightness of a measured image of an actually captured image of a measured article during execution of a part program is identical to brightness of a measured image of a captured image during creation of a part program.

2. Description of Related Art

An image measuring apparatus having an autofocus function moves an image capturer, such as a camera, or an optical system thereof along an optical axis direction and sequentially captures images of a measured object, and then determines that a position in the optical axis direction where an image having the highest contrast is captured becomes a focus position (Japanese Patent Laid-Open Publication No. 2009-168607).

When such an image measuring apparatus uses a USB camera as an image capturer, a frame rate is increased in a limited image capture range during image autofocus due to constraints of a transfer rate. This shortens an exposure time, resulting in a dark captured image and poor autofocus accuracy. Thus, illumination intensity of an illumination device needs to be adjusted according to the frame rate. The present applicant suggested in Japanese Patent Laid-Open Publication No. 2012-151714 that an increase in a frame rate of an image capturer and a decrease in an exposure time associated therewith be compensated by an increase in an amount of light of an illumination device.

Meanwhile, an LED illumination device using an LED device as a light source defines a standard of an illumination intensity curve and performs calibration in order to reduce variation in LED devices.

Figure 1:
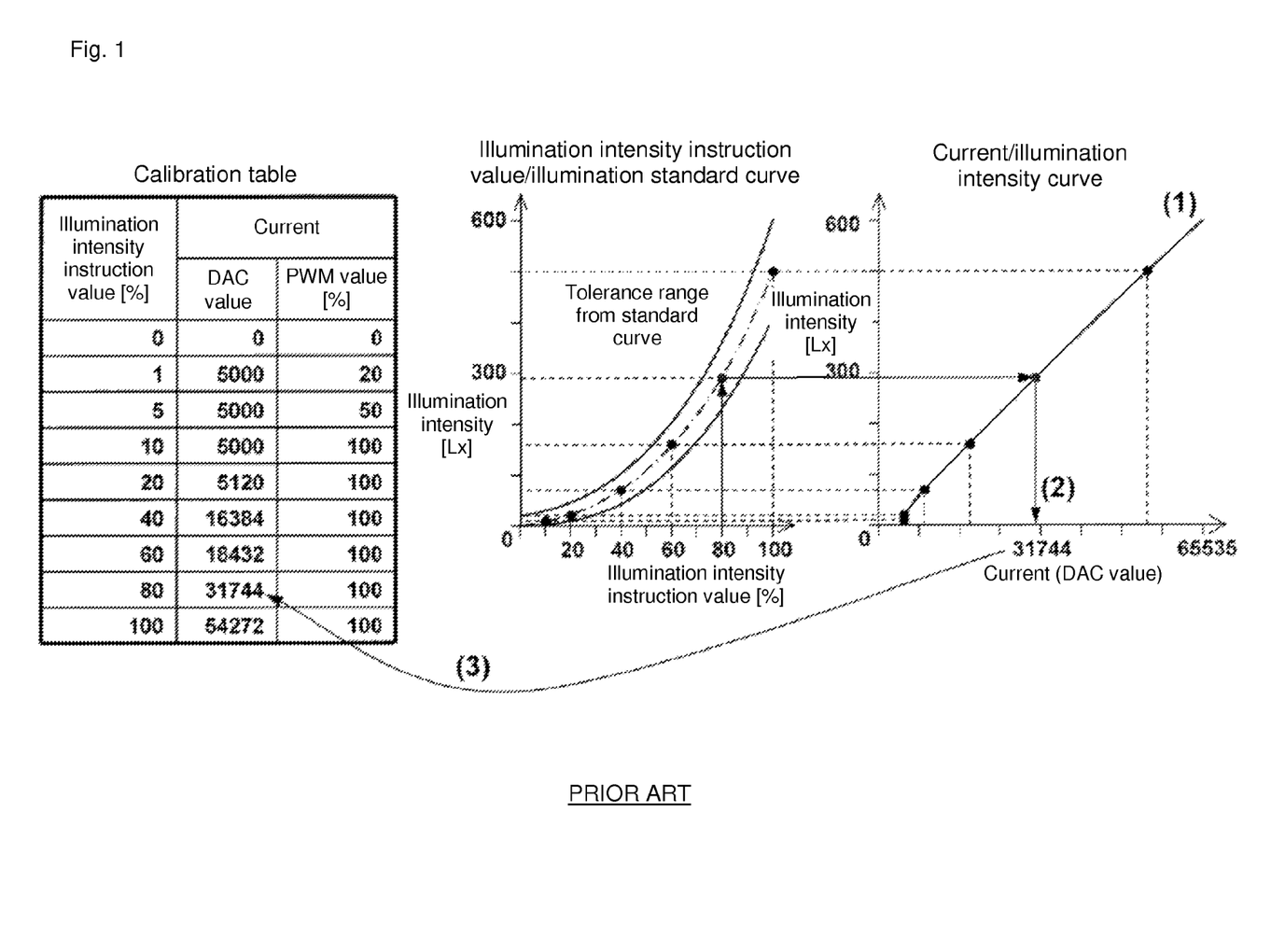
FIG. 1 illustrates a conventional calibration method of LED lighting.

Specifically, with reference to FIG. 1, (1) Values of current flowing through an LED device (a digital/analog conversion (DAC) value and a pulse width modulation (PWM) value in a low illumination area where current control is difficult) are first changed from 0 to a maximum value (65535 in the drawing), and then current/illumination intensity curve data of the LED device is obtained as shown on the right-hand side in FIG. 1.

(2) Based on the current/illumination intensity curve data obtained in (1), the current values (DAC value and PWM value) associated with an illumination intensity instruction value/illumination intensity standard curve as shown in the center of FIG. 1 are then calculated (a current (DAC) value of 31744 at an illumination intensity instruction value of 80% in FIG. 1), the illumination intensity instruction value/illumination intensity standard curve representing a relationship between an illumination intensity instruction value given to an illumination device and actual illumination intensity of the illumination device.

The illumination intensity instruction value herein is a % value of brightness instructed to the illumination device from software of a personal computer (PC), for example, where the maximum illumination intensity [Lx] of a standard defined for each model of an illumination device is 100% and a state of no illumination is 0%. Since brightness control similar to halogen lighting, which is conventionally used for an image measurer, is desirable, the illumination intensity instruction value in the % value and the actual illumination intensity [Lx] of the illumination device establishes an exponential relationship.

(3) A calibration table (illumination intensity instruction value/current values (DAC value and PWM value)) is then created from the current values calculated in (2), as shown in the left-hand side in FIG. 1, and is then written in a non-volatile memory, for example, an EEPROM, of an illumination controller.

To set the illumination intensity for image autofocus, (1) The illumination intensity [Lx] required is calculated according to an exposure time of image autofocus. With an illumination intensity instruction value of 40% before limiting an image capture range, when the image capture range is limited to ½, for example, and a frame rate is doubled, the exposure time is ½. To maintain the brightness of the captured image, the illumination intensity instruction value is doubled to 80%.

(2) The calculated instruction value (80%) is then set on the illumination controller and the LED device is activated.

Essentially, when the exposure time (1/frame rate) changes, the illumination intensity [Lx] needs to be changed accordingly. The calibration table in an EEPROM, for example, however, stores only the illumination intensity instruction value and the current values (DAC value and PWM value), as shown in the left-side in FIG. 1. Thus, the target illumination intensity cannot be calculated without the current illumination intensity. In a case where software stores the illumination intensity instruction value/illumination intensity standard curve of the illumination device, the calibration table does not need to include illumination intensity data. To this end, the software needs to include in advance product standard information of all illumination device. When a new illumination device is added as a new product, the software needs to be updated to include standard information of the new illumination device.

Furthermore, illumination devices of the same model type are adjusted to fit the illumination intensity instruction value/illumination intensity standard curve. Practically, however, the standard curve has a substantial range of tolerance as shown in the center of the FIG. 1 to increase the yield of LED devices and reduce the man-hour for adjustment. The tolerance of the illumination intensity [Lx] at an illumination intensity instruction value of 20% or more is within ±5%, for example, and is gradually widened toward dark from 20% or less. The tolerance of the illumination intensity [Lx] of the illumination device at an illumination intensity instruction value of 1% is within ±50%, for example.

Figure 2:
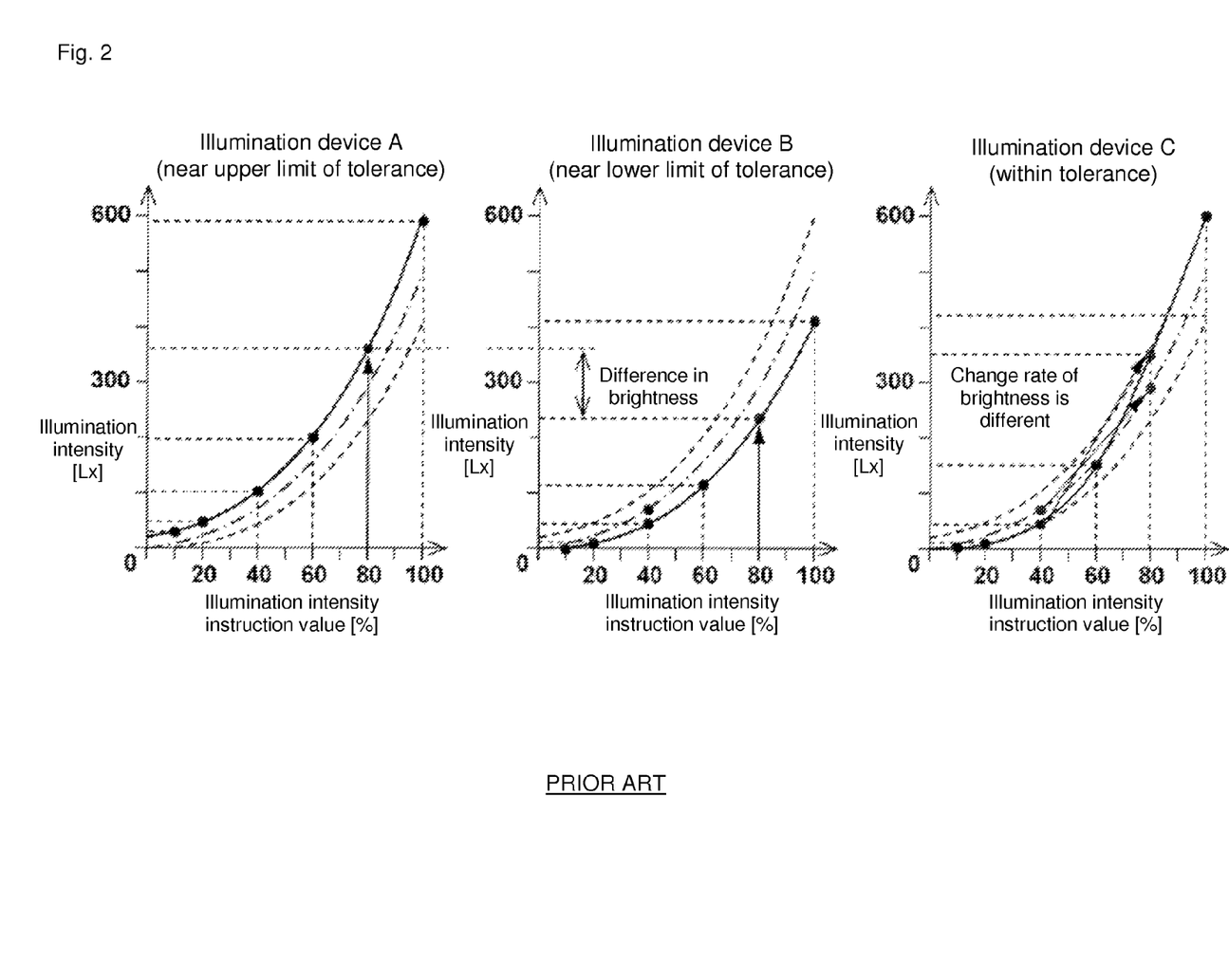
FIG. 2 illustrates problems of the conventional calibration method.

Thus, as shown in FIG. 2, the actual illumination intensity is slightly different depending on a device even among illumination devices of the same model type. The illumination intensity of illumination devices is different between an illumination device A, which is close to an upper limit of the tolerance, and an illumination device B, which is close to a lower limit thereof, even with the same illumination intensity instruction value. In some cases, the illumination intensity of an illumination device does not change at a rate of the standard. An illumination device C shown in FIG. 2 changes the illumination intensity at a rate greater than the standard. The tolerance is wider as the illumination intensity instruction value is lower. Thus, when the illumination intensity instruction value is lowered during measurement of a work piece having a high reflection rate, such as a mirror, this issue is noticeable. Accordingly, the illumination intensity is substantially out of the target, preventing accurate image autofocus.

For measurement using a camera, a contrast between end sections of a measured article (also referred to as a work piece) is detected based on a captured image, and a distance between the end sections is produced as a measurement result. Specifically, an optimum contrast is required for accurate measurement. Such an optimum contrast is provided by an illumination device mounted to an image measuring apparatus. The illumination device can adjust illumination in a wide range according to an instruction from a personal computer or a measurer main body. In actual measurement, the illumination intensity instruction value is adjusted to provide an optimum contrast for measurement of end sections of a work piece, and then measurement is performed.

When a plurality of work pieces of the same type are measured, it is cumbersome to fine-tune the illumination intensity instruction value every time a work piece is replaced. Thus, in such a case where work pieces of the same type are repeatedly measured, mostly the illumination intensity instruction value is determined once and fixed for measurement even when a work piece is replaced. In this method, however, brightness of measured images of captured images is not strictly the same in cases below, and thus measurement results are less reliable.

(1) Even with the same amount of light, the brightness of a measured image of a captured image is different due to a surface condition of a work piece or processing.

(2) An image measuring apparatus is different and the same amount of light is not provided even with the same illumination intensity instruction value.

(3) Even with the same image measuring apparatus, the same amount of light is not provided as before due to attenuation of illumination intensity attributed to deterioration with age of an illumination device.

To address the circumstances above, a brightness tool is used in which reference brightness of a measured image of a captured image is registered in such repetitive measurement above (part program measurement), and even when work pieces change, the illumination intensity instruction value is automatically fine-tuned to provide the same brightness of a measured image of a captured image.

Figure 3:
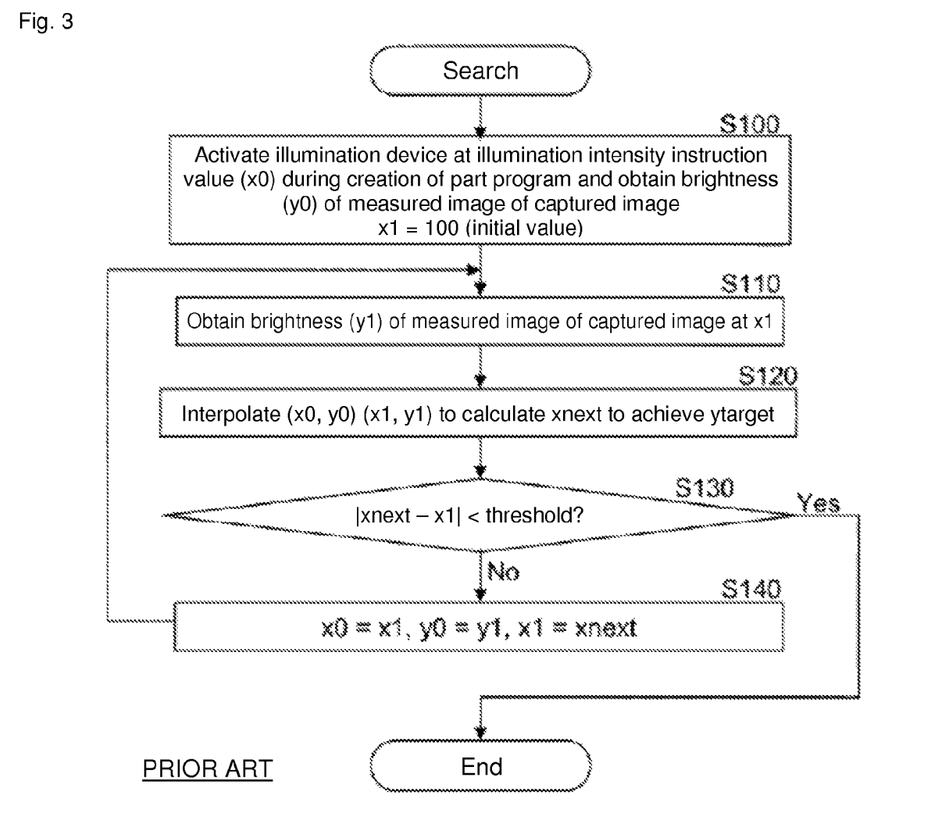
FIG. 3 is a flowchart illustrating a processing procedure of a conventional brightness tool.

In the brightness tool, as shown in FIG. 3, first in Step S100, an illumination device is activated at an illumination intensity instruction value x0 during creation of a part program to obtain brightness y0 of a measured image of a captured image and set x1=100 (initial value).

Then, in Step S110, brightness y1 of the measured image of the captured image at x1 is obtained.

Figure 4:
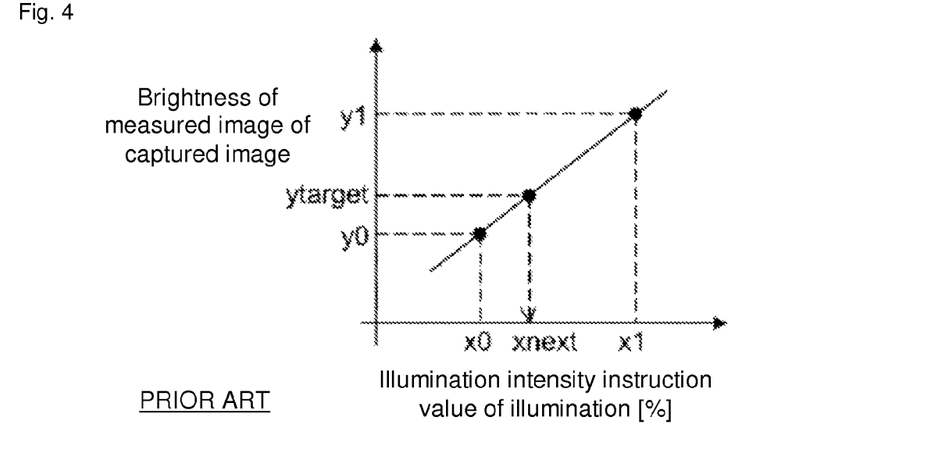
FIG. 4 illustrates an exemplary relationship between an illumination intensity instruction value of lighting and brightness of a measured image of a captured image of the conventional brightness tool.

Then, in Step S120, (x0, y0) and (x1, y1) are interpolated as shown in FIG. 4 to calculate a next illumination intensity instruction value xnext that provides a target brightness ytarget of the measured image.

Then, in Step S130, a determination is made as to whether an absolute value of difference between xnext and x1 is equal to or less than a threshold value.

When the determination is no, the process proceeds to Step S140 to set x0=x1, y0=y1, and x1=xnext, and then returns to Step S110.

On the other hand, when the determination in Step S130 is yes, the proceeds ends.

This brightness tool allows a measurer to eliminate an effort to manually fine-tune the illumination intensity instruction value and achieves highly reliable measurement results.

Even in this brightness tool, however, the changing illumination intensity instruction value xnext to the illumination device is a predicted value and the brightness ytarget of the measured image of the captured image as a final target is attained through so-called trial and error. Thus, it takes time due to a large number of times of trial and error.

In addition, in a series of operations of "changing the illumination intensity instruction value to the illumination device→obtaining an actual image→confirming brightness of a measured image of the actually obtained image," it takes time before the illumination intensity of the illumination device is stabilized after the change and software needs to wait for a convergence time. Specifically, halogen lighting is slow in response in unit of second due to its principle of using emission of light from heating a filament. On the other hand, LED lighting is quick in response. However, since the amount of light emission is susceptible to change in surrounding temperature, the illumination intensity is not stable for a certain period of time due to change in self-heating associated with the change of the illumination intensity instruction value. As a result, it takes time to execute the brightness tool.

SUMMARY OF THE INVENTION

In view of the conventional circumstances above, a primary advantage of the present invention is to achieve highly accurate image autofocus by setting an illumination device at appropriate illumination intensity such that brightness of a measured image of a captured image is the same even when a frame rate (exposure time) is changed.

A secondary advantage of the present invention is to provide computer software for a brightness tool capable of reducing an execution time of the brightness tool.

An aspect of the present invention provides a method of setting illumination of an image measuring apparatus. The method includes calculating a current value corresponding to a relationship between an illumination intensity instruction value and illumination intensity based on a previously obtained relationship between a current flowing through a light emitting device and the illumination intensity; creating a calibration table including the illumination intensity instruction value, the current value, and the illumination intensity; calculating a required illumination intensity during measurement; calculating an illumination intensity instruction value corresponding to the required illumination intensity; and setting the illumination intensity instruction value using the calibration table.

Another aspect of the present invention provides an illumination setting apparatus of an image measuring apparatus. The illumination setting apparatus includes a calibration table including an illumination intensity instruction value, a current value, and illumination intensity, the calibration table being created by calculating the current value corresponding to a relationship between the illumination intensity instruction value and the illumination intensity based on a previously obtained relationship between a current flowing through a light emitting device and the illumination intensity; a calculator calculating a required illumination intensity during measurement; a calculator calculating an illumination intensity instruction value corresponding to the required illumination intensity; and a setter setting the illumination intensity instruction value using the calibration table.

Another aspect of the present invention provides a computer-readable medium for a brightness tool setting illumination such that brightness of a measured image of an actually obtained image of a measured article during execution of a part program is identical to brightness of a measured image of an obtained image during creation of the part program. The computer-readable medium includes retaining a calibration table including an illumination intensity instruction value, a current value, and illumination intensity, obtained from the brightness of the measured image of the actually obtained image at an illumination intensity instruction value during creation of the part program; and calculating an illumination intensity instruction value corresponding to the required illumination intensity using the calibration table.

According to the present invention, illumination intensity data is stored in the calibration table. Thus, a new illumination device product can be supported without updating a version of software. Furthermore, even when a tolerance of a standard curve of the illumination intensity instruction value and illumination intensity is wide, lighting is available at accurate illumination intensity.

In addition, in the image measuring apparatus, even when a frame rate is increased and an exposure time is shortened during image autofocus, a measured image of an obtained image can be input with stable brightness. This achieves both improvement in throughput and highly accurate measurement.

In addition, in the brightness tool, an execution time of the brightness tool is shortened, and thus usability is improved. Specifically, in a case of repeatedly measuring work pieces of the same type, highly reliable measurement can be quickly performed without requiring effort.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Embodiments of the present invention are described in detail below with reference to the drawings.

An image measuring apparatus to which the present invention is applied is first described.

Figure 5:
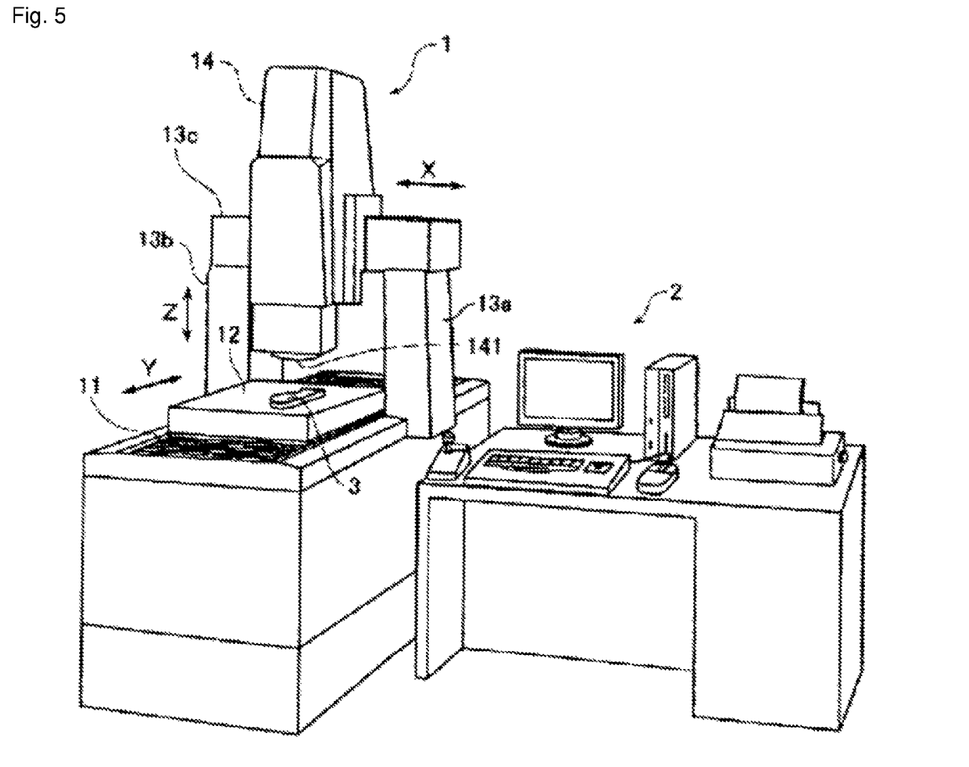
FIG. 5 is an overall view of a configuration of an image measuring apparatus to which the present invention is applied.

With reference to FIG. 5, the image measuring apparatus has an image measurer 1 and a computer (hereinafter referred to as PC) 2 electrically connected to the image measurer 1. The image measurer 1 is equipped with a camera 141 as an image capturer to capture an image of a work piece 3.

The image measurer 1 is configured as below. Specifically, on a sample mover 11, a sample stage 12 is placed such that an upper surface thereof as a base surface is aligned with a horizontal plane. The sample mover 11 supports an X-axis guide 13c at upper ends of arm support bodies 13a and 13b standing from two side ends of the sample mover 11. The sample stage 12 is driven in a Y-axis direction by the sample mover 11. An image capture unit 14 is supported so as to be drivable in an X-axis direction. The camera 141 is mounted to a lower end of the image capture unit 14.

In the present embodiment, an image of the work piece 3 placed on the sample stage 12 is captured. Alternatively, another method may be employed in which, for example, an image of a work piece placed on a floor is captured from a lateral direction. Various kinds of cameras, including a CCD and CMOS, can be used for the camera 141.

Figure 6:
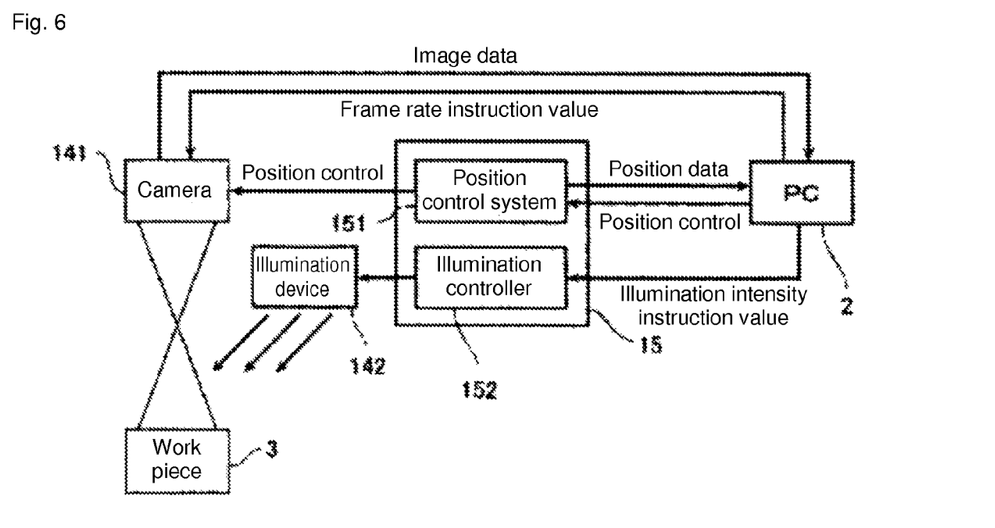
FIG. 6 is a block diagram illustrating a configuration of the image measuring apparatus.

FIG. 6 is a block diagram illustrating a configuration of the image measuring apparatus according to the present embodiment. In the present embodiment, the image measuring apparatus has a controller 15 inside the image measurer 1. The controller 15 has a position control system 151 and an illumination controller 152. The image capture unit 14 has an illumination device 142 irradiating the work piece 3 with light. The PC 2 controls a focus position of the camera 141 through the position control system 151. The PC 2 also transmits to the camera 141a frame rate specifying signal specifying a frame rate, and to the illumination controller 152 an illumination intensity instruction value signal specifying an amount of light of the illumination device 142. The camera 141 captures an image of the work piece 3 irradiated by the illumination device 142 at the specified frame rate, and transmits image data to the PC 2. At this time, the position control system 151 transmits position data of the camera 141. Various types of lighting can be used as the illumination device 142, including, for example, a PWM control LED.

Figure 7:
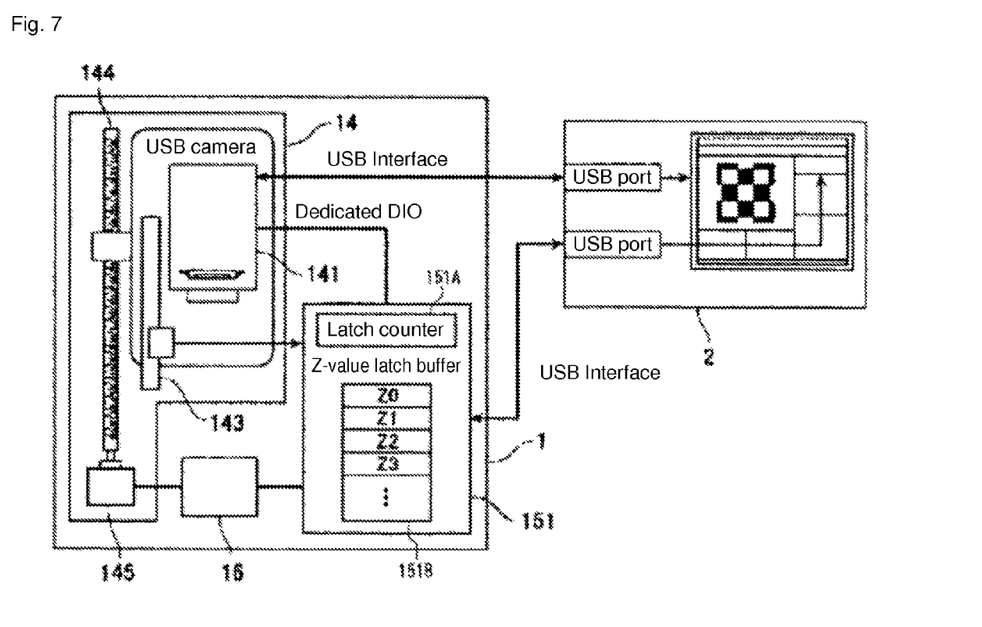
FIG. 7 is a block diagram illustrating a configuration of a portion of the image measuring apparatus.

A configuration of the image capture unit 14 of the image measuring apparatus according to the present embodiment is described below. FIG. 7 is a block diagram illustrating a configuration of a portion of the image measuring apparatus according to the present embodiment. In the present embodiment, the image capture unit 14 has the camera 141, a linear encoder 143, a camera drive mechanism 144, and a Z-axis motor 145. The linear encoder 143 detects and outputs a Z coordinate of the camera 141. The camera drive mechanism 144 drives the camera 141 in a Z-axis direction. The Z-axis motor 145 drives the camera drive mechanism 144. The Z-axis motor 145 is controlled by the position control system 151 through a power unit 16 provided with the image measurer 1. The linear encoder 143 is attached such that a scale or a detection head moves in the Z-axis direction in conjunction with the camera 141. The position control system 151 has a latch counter 151A and a Z-value latch buffer 151B. In response to a trigger signal, the position control system 151 obtains Z coordinate data of the camera 141 from the linear encoder 143 and stores the data in the Z-value latch buffer 151B. The camera 141 is connected to the PC 2 through a USB interface and to the position control system 151 through a dedicated DIO (digital input/output).

The position control system 151 outputs a Z-axis drive command to the power unit 16. The power unit 16 supplies drive power to the Z-axis motor 145, which then allows the camera drive mechanism 144 to drive the camera 141. The camera 141 captures an image at a desired frame rate and transfers image data to the PC 2 through the USB interface. At this time, a vertical synchronizing signal may be output as a trigger signal from the camera 141 to the position control system 151. In this case, the position control system 151 receives the vertical synchronizing signal, and accordingly obtains a Z coordinate of the camera 141 from the linear encoder 143. The obtained Z coordinate is retained in the Z-value latch buffer 151B and the latch counter 151A is updated. The retained Z value is transmitted to the PC 2 in response to a read command. In the present embodiment, the camera 141 is driven along the Z-axis direction. Alternatively, a similar operation can be achieved by controlling an optical system, such as a lens, included in the camera 141. In addition, the USB interface is used as a digital serial communication method in the present embodiment. Alternatively, another digital serial communication method, such as, Gig-E or FireWire, may be used for communication.

Figure 8:
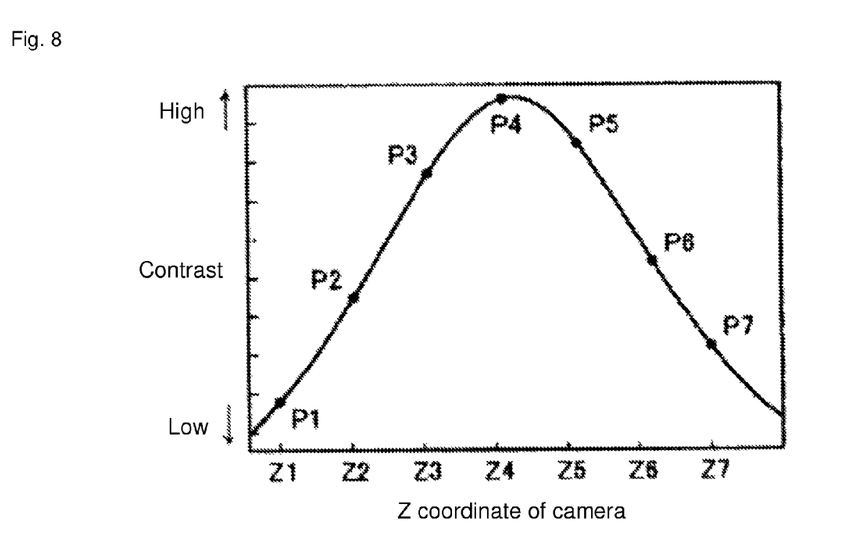
FIG. 8 illustrates a method of autofocus of the image measuring apparatus.

A method of autofocus of the image measuring apparatus according to the present embodiment is described below. FIG. 8 illustrates the method of autofocus of the image measuring apparatus according to the present embodiment. A horizontal axis represents the Z coordinate of the camera 141 and a vertical axis represents a contrast.

During autofocus of the image measuring apparatus according to the present embodiment, images are captured at a plurality of Z coordinates and contrasts are calculated from the images at the respective Z coordinate positions. A Z coordinate where an image having the highest numerical value among the plurality of calculated contrasts is obtained is determined to be a focus position. In an example of FIG. 8, images are captured at seven Z coordinates (Z1 to Z7) and contrasts (P1 to P7) at the respective Z coordinates are calculated. In the example of FIG. 8, the contrast P4 at Z4 is the highest, and thus Z4 is determined to be a focus position. The Z coordinate of the camera 141 is thus aligned to Z4.

In such contrast autofocus, a more accurate focus position can be obtained by increasing the number of image output positions. With the increase in the image output positions, however, the volume of data transmitted from the camera 141 to the PC 2 increases. In the present embodiment, the camera 141 and the PC 2 are connected via the USB interface, and thus a transfer rate of image data is limited up to approximately 400 Mbps and the time required for autofocus is increased. In the image measuring apparatus according to the present embodiment, only a portion of an image within an image capture range is thus cut out and transmitted for autofocus. This decreases the volume of data transmitted from the camera 141 to the PC 2 and increases the frame rate.

Figure 9:
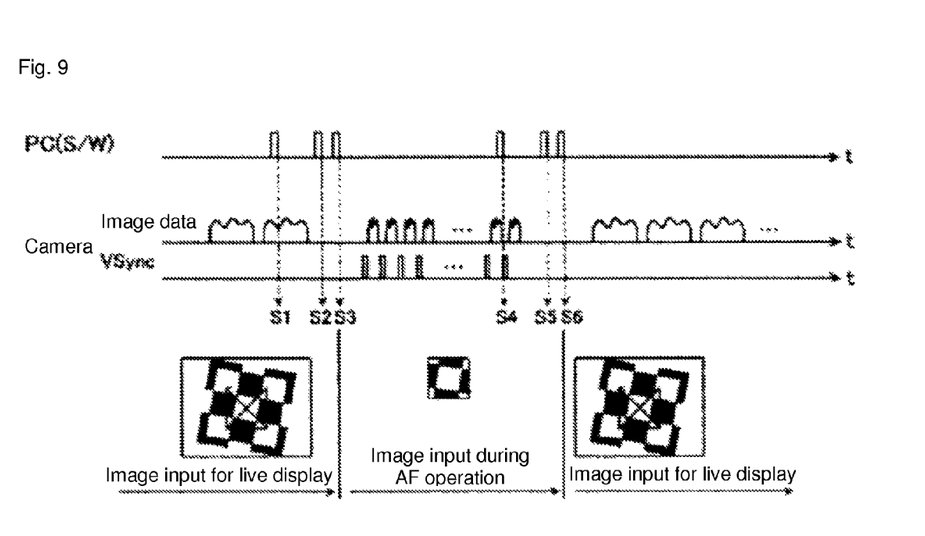
FIG. 9 is a timing chart illustrating the method of autofocus of the image measuring apparatus.

The autofocus processing is described with reference to FIG. 9. FIG. 9 is a timing chart illustrating signals communicated between the camera 141 and the PC 2 during autofocus of the image measuring apparatus according to the present embodiment. A portion of signals transmitted from the PC 2 to the camera 141 are shown above while signals transmitted from the camera 141 to the PC 2 are shown below.

In a live display mode prior to initiation of autofocus, image data in the entire image capture range are transmitted from the camera 141 to the PC 2, as shown in the bottom-left of FIG. 9. When the PC 2 transmits to the camera 141a command to stop image output at timing S1, image output from the camera 141 stops. Then, the camera 141 transmits to the position control system 151a command to reset the latch counter 151A. When the latch counter 151A is reset, the camera 141 is driven to an autofocus start point.

At timing S2, the PC 2 transmits to the camera 141a command to specify an image output range. Then, the range of the image transmitted from the camera 141 to the PC 2 is limited as shown in the center of a lower portion of the FIG. 9, for example. At this time, a command to output a vertical synchronizing signal can be issued simultaneously. Subsequently, at timing S3, the PC 2 issues to the camera 141a command to start image output, and then the camera 141 outputs the image data and timestamp to the PC 2. When the command to output the vertical synchronizing signal was issued at timing S2, the camera 141 transmits a vertical synchronizing signal to the position control system 151, and a Z coordinate and timestamp at the time of image capture by the camera 141 are retained. When no vertical synchronizing signal is used, the camera 141 and the position control system 151 can also be synchronized in a different method, such as, by calculating a timing of image capture by the camera 141 from a frame rate of the camera 141 and obtaining a Z coordinate of the camera 141 at the calculated timing.

At timing S4, when autofocus is complete, the PC 2 issues to the camera 141a command to stop image output. At subsequent timing S5, the PC 2 transmits a signal to release settings of the camera 141 during the autofocus (specification of the image output range and output of the vertical synchronizing signal). Furthermore, the PC 2 transmits to the position control system 151a command to stop Z movement and a command to end latch, and a command to read a latch number. Then, the position control system 151 stops the camera 141 from moving and the latch counter 151A and Z-value latch buffer 151B from operating, and then transmits the latch number to the PC 2. Subsequently, the PC 2 outputs to the position control system 151a command to read latch data. Then, the position control system 151 transmits to the PC 2 data in the Z-value latch buffer 151B (Z coordinate and timestamp). The PC 2 associates the image data and the Z coordinate based on the timestamp and obtains a relationship between a contrast calculated from the image data and Z value. Thereafter, the PC 2 determines as a focus position a Z value of an image having the highest contrast, and moves the Z coordinate of the camera 141 to the calculated focus position.

Lastly, at timing S6, the PC 2 transmits a command to resume image output for live display. Then, the autofocus operations end and normal transmission of the image data in the entire image capture range resumes. At this time, the image transmitted from the camera 141 to the PC 2 has the same size as prior to the start of the autofocus, as shown in the bottom-right of the FIG. 9.

In the method above, the size of the image transmitted from the camera 141 to the PC 2 is reduced, thus enabling an substantial increase of the frame rate of the camera 141 regardless of the transfer rate of the USB interface. In the method above, however, an exposure time per frame is reduced, and thus an amount of light of a captured mage is reduced. This reduces the contrast and deteriorates autofocus accuracy. The higher the resolution is, the smaller a light-receiving area of pixels becomes, and thus an S/N ratio becomes deteriorated.

Figure 10:
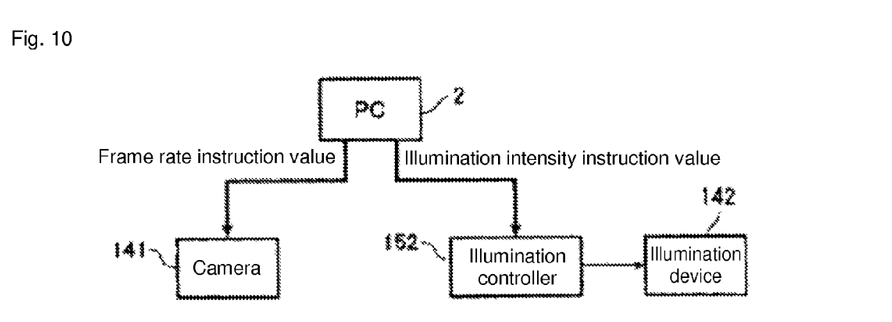
FIG. 10 is a block diagram illustrating a method of controlling illumination of the image measuring apparatus.

To address the circumstances, the amount of light of the illumination device 142 is increased during the autofocus in the present embodiment. This illumination control is described with reference to FIG. 10. FIG. 10 is a block diagram illustrating a method of controlling illumination of the image measuring apparatus according to the present embodiment.

The illumination controller 152 and the camera 141 are connected in parallel to the PC 2. The illumination device 142 is connected to the illumination controller 152. When the autofocus starts, a command to stop image output is transmitted at timing S1 of FIG. 9 as described above, and a command to start signal output is issued at timing S3. In the present embodiment, during the period from timing S1 to S3, specifically, from the stopping of image output from the camera 141 to the PC 2 to the resuming of image output at a specified frame rate, the PC 2 transmits to the illumination controller 152 an illumination intensity instruction value for the illumination device 142.

Accordingly, increasing the amount of light of the illumination device 142 according to an increase of the frame rate of the camera 141 compensates a reduction in the amount of light associated with a reduction in the exposure time and thus prevents deterioration in contrast. This enables a substantial increase in the number of frames to obtain image data per unit time while maintaining accuracy of the contrast, and achieves highly accurate and high-speed autofocus. In addition, such a configuration can be readily achieved at low cost by using an existing PC and image measurer with software only. Alternatively, an average value of brightness or contrast of the obtained image can be calculated by the PC 2 and the illumination controller 152 can be controlled accordingly. Furthermore, illumination may be automatically adjusted by the illumination controller 152 based on an interval of the vertical synchronizing signal output from the camera 141. In this case, the PC 2 does not need to be involved.

In the first embodiment of the present invention, in addition to the method of calibration of the image measuring apparatus described above with reference to FIG. 1, illumination intensity [Lx] of the illumination device 142 is measured at each illumination intensity instruction value [%] and the illumination intensity Lx data is added to the calibration data. Herein, the illumination intensity data retains actually measured data due to an error of an LED device with respect to a standard value.

Figure 11:
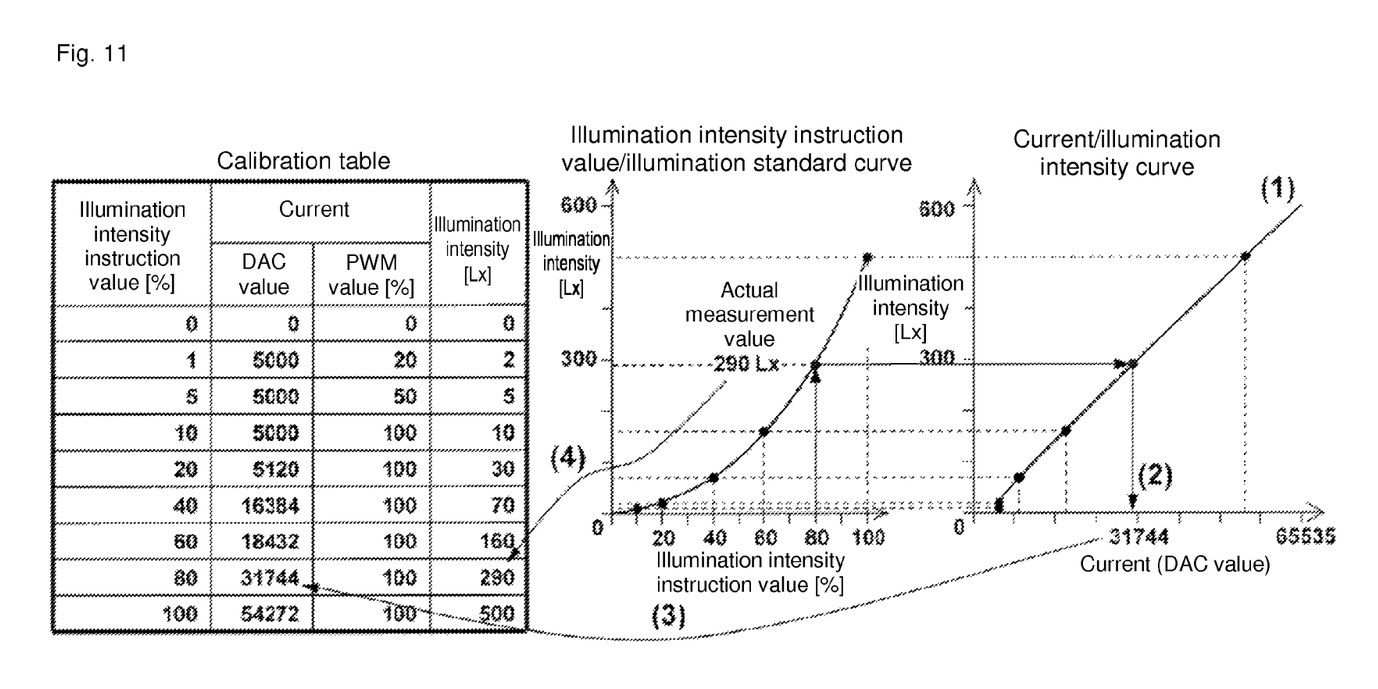
FIG. 11 illustrates a method of calibration according to a first embodiment of the present invention.

Specifically, with reference to FIG. 11, after processes (1) to (3) similar to the conventional processes described with reference to FIG. 1, (4) The illumination intensity of the illumination device 142 is measured at each illumination intensity instruction value (290 Lx in an example of the drawing) and is added to a calibration table. Due to a calibration error included, an actually measured value is used herein instead of calculation from a standard curve. Verification is performed after calibration, and thus the entire processing time is the same.

Figure 12:
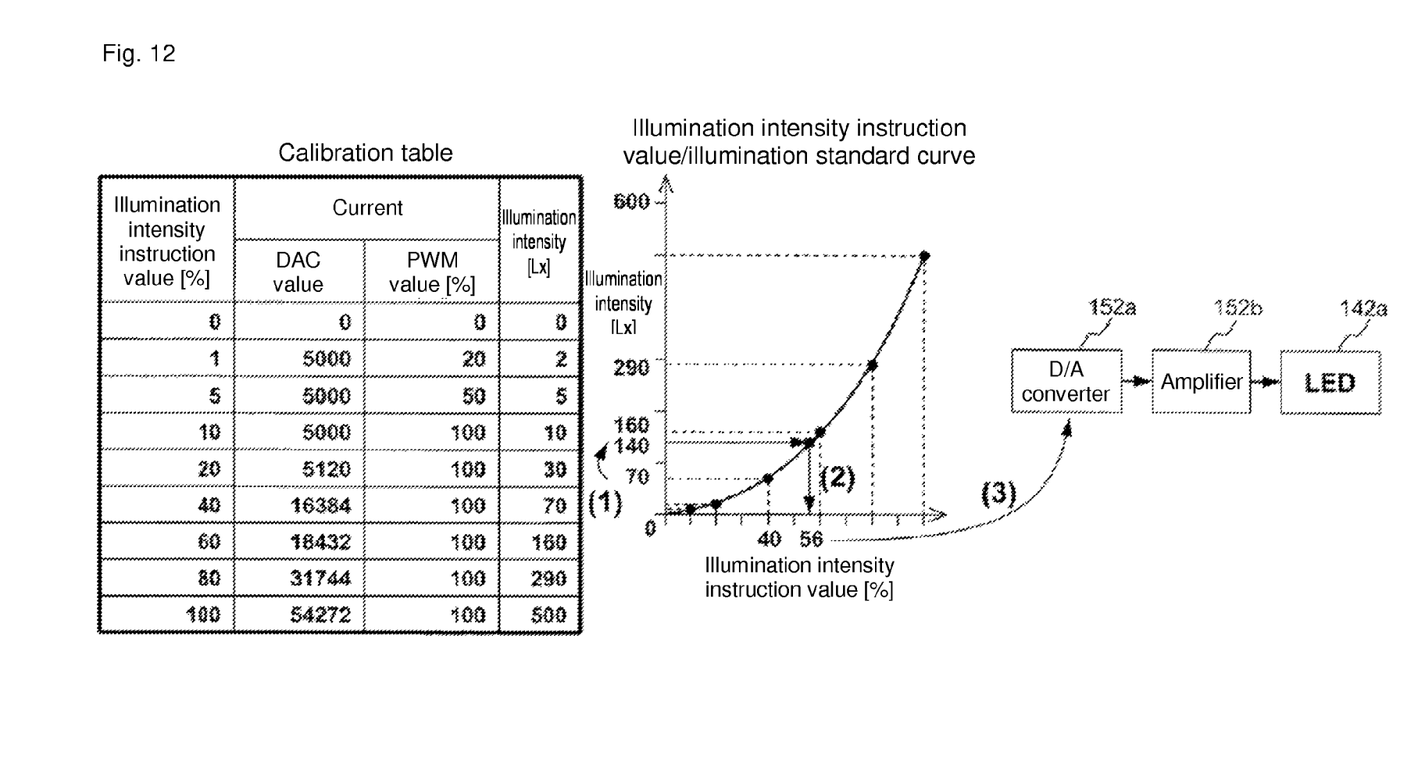
FIG. 12 illustrates a procedure for setting illumination according to the first embodiment.

The illumination intensity for image autofocus is set as shown in FIG. 12.

(1) Required illumination intensity is first calculated. For example, in a case where the illumination intensity is 70 Lx at an illumination intensity instruction value of 40%, when the exposure time halves, the illumination intensity is required to double to 140 Lx.

(2) Using an illumination intensity instruction value/illumination intensity actual measurement value curve shown in the right center of FIG. 12, the illumination instruction value that corresponds to the required illumination intensity of 140 Lx is then calculated (56% herein).

(3) The calculated illumination intensity instruction value is then set to the illumination controller 152. As shown in the right-hand side in the FIG. 12, the illumination intensity instruction value is transmitted to a D/A converter 152a in the illumination controller 152. Then, the illumination intensity instruction value passes through an amplifier 152b and is output to an illumination device, which is an LED 142a herein, to activate an LED. PWM control is also used in a low illumination intensity area. Then, an illumination intensity of 140 Lx is provided, which is double the illumination intensity at an illumination intensity instruction value of 40%.

A second embodiment is described below, where the present invention is applied to a brightness tool.

Figure 13:
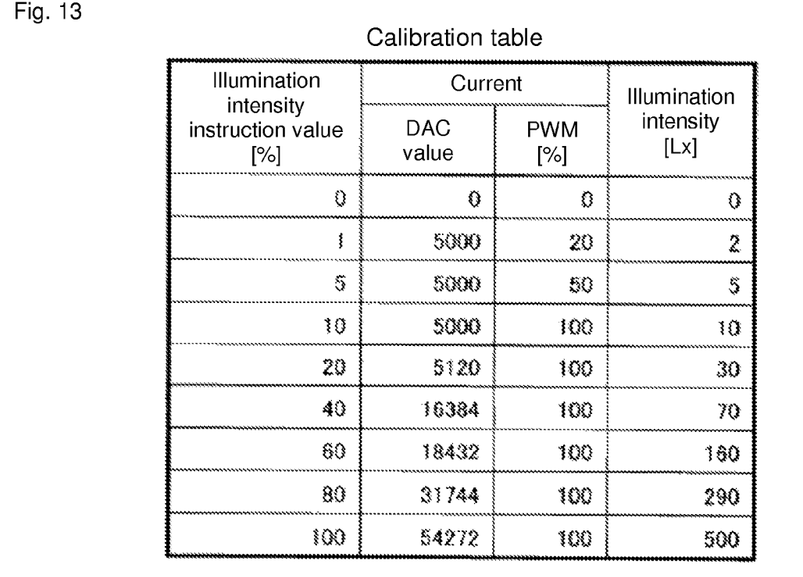
FIG. 13 illustrates a calibration table according to a second embodiment of the present invention.

With reference to FIG. 13, in the present embodiment, illumination intensity data is added to a calibration table for illumination stored in the illumination controller 152, for example, similar to the first embodiment. Based on an illumination intensity instruction value and illumination intensity in the calibration table, an illumination intensity instruction value estimated to achieve the target brightness is calculated accurately. By reducing the number of repeating a series of operations of "changing an illumination intensity instruction value to an illumination device→obtaining an actual image→confirming brightness of a measured image of the actually obtained image," an entire execution time of the brightness tool is reduced.

Figure 14:
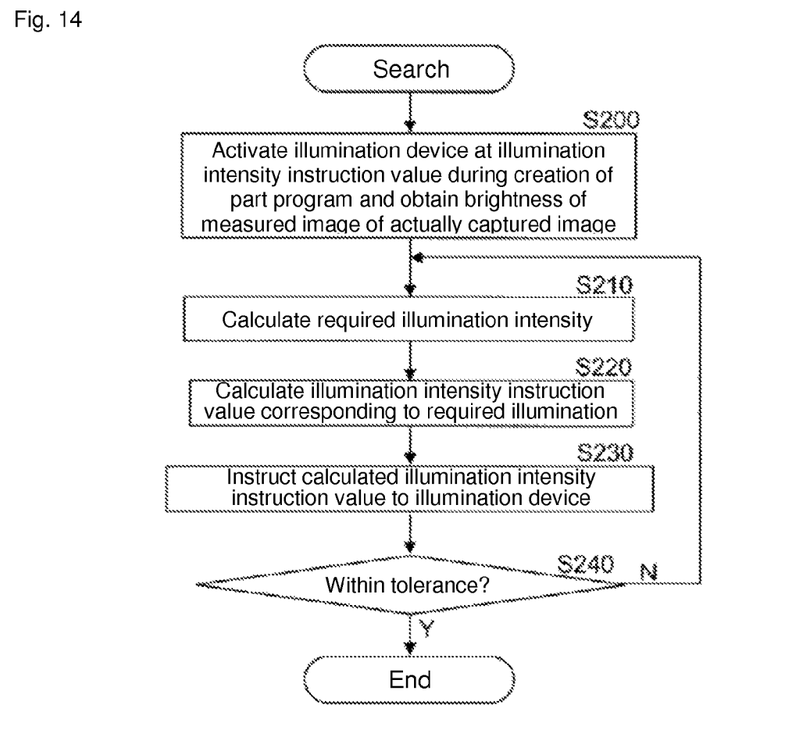
FIG. 14 is a flowchart illustrating a processing procedure according to the second embodiment.

Specifically, with reference to FIG. 14, first in step S200, the illumination device 142 is activated at an illumination intensity instruction value during creation of a part program to obtain brightness of a measured image of an actually captured image. In the example of FIG. 13, for instance, brightness of a measured image of an image having a 256 tones (8-bit) at an illumination intensity instruction value of 40% is 150 during creation of a part program and turns out to be 120 during execution of the part program. The cause is attributed to the issues (1) to (3) described in Description of Related Art.

Then, the process proceeds to step S210, in which required illumination intensity is calculated. For the example above, a formula is provided as follows:

Required illumination intensity=70 [Lx]×150/120=87.5 [Lx]

Then, the process proceeds to step S220, in which an illumination intensity instruction value that corresponds to the required illumination intensity is calculated. In the example above, the illumination intensity instruction value that corresponds to an illumination intensity instruction value of 40% during creation of the part program is calculated from a formula below.

$$\begin{aligned}\text{Illumination intensity instruction value} &= (60[\%] - 40[\%]) \times \\ &\quad (87.5[Lx] - 70[Lx])/ \\ &\quad (160[Lx] - 70[Lx]) + 40[\%] \\ &= 43.888\ldots \approx 43.89[\%]\end{aligned}$$

Then, the process proceeds to step S230, in which the calculated illumination intensity instruction value of 43.89% is provided to the illumination device 142.

In step S240, when the brightness of the measured image on the obtained image is determined to be within a tolerance range, the process ends. On the other hand, when the brightness is determined to be outside the tolerance range, the process returns to step 210.

The illumination intensity instruction value calculated in step S220 is highly accurate. Thus, even when the brightness is not within the tolerance for the first time, the number of repetition is substantially reduced. The process was conventionally repeated approximately 10 times, but it is approximately once or twice according to the present invention.

As described in the issue (3) in Description of Related Art, there is a case where 70 [Lx] is not achieved at an illumination intensity instruction value of 40[%] due to deterioration with age. Since the brightness deteriorates at substantially the same rate from 0[%] to 100[%] during deterioration with age, an approximate value can be used from interpolation calculation at a brightening rate as in the formula of step S220. When lighting is so deteriorated that this interpolation is not available, the lighting is serviced or replaced.

When the brightness illumination intensity instruction value of the part program is low, for example, 5[%], the illumination intensity of the illumination device 142 cannot be fine-tuned by control in units of 1[%]. Thus, control is preferred at a finer level than the minimum resolution 1[%] of the illumination intensity instruction value specified by the part program.

The calibration table does not necessarily need to be stored in the illumination controller 152, but may be stored in the PC 2 or the illumination device 142.

Furthermore, a light emitting device that serves as a light source is not limited to an LED.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof.

The present invention is not limited to the above-described embodiments, and various variations and modifications may be possible without departing from the scope of the present invention.

What is claimed is:

1. A method of setting illumination of an image measuring apparatus, the method comprising:
    calculating a value of a current corresponding to a relationship between an illumination intensity instruction value and illumination intensity based on a previously-obtained relationship between a current flowing through a light emitting device and the illumination intensity;
    creating a calibration table including the illumination intensity instruction value, the calculated value of the current, and the illumination intensity;
    storing, in a memory, the calibration table;
    emitting light, by the light emitting device, at a work piece;
    performing autofocusing of the image measuring apparatus;
    determining exposure time per frame during the autofocusing;
    calculating a required illumination intensity based on the determined exposure time per frame;
    calculating an illumination intensity instruction value corresponding to the required illumination intensity using the calibration table; and
    setting the calculated illumination intensity instruction value for measuring the work piece.

2. An illumination setting apparatus of an image measuring apparatus, the illumination setting apparatus comprising:
- a memory configured to store a calibration table having an illumination intensity instruction value, a value of a current, and illumination intensity, wherein the calibration table is the result of calculating the value of a current corresponding to a relationship between the illumination intensity instruction value and the illumination intensity based on a previously-obtained relationship between a current flowing through a light emitting device and the illumination intensity;
- a light emitting device configured to emit light at a work piece;
- a camera configured to perform autofocusing on the work piece;
- a processor configured to determine exposure time per frame during the autofocusing;
- an illumination controller configured to:
- calculate a required illumination intensity based on the determined exposure time per frame;
- calculate an illumination intensity instruction value corresponding to the required illumination intensity using the calibration table; and
- set the calculated illumination intensity instruction value to measure the work piece.

3. At least one non-transitory computer-readable medium storing an executable set of instructions such that brightness of a measured image of an actually-obtained image of a measured article during execution of a part program is identical to brightness of a measured image of an obtained image during creation of the part program which, when executed by a processor, causes the processor to execute operations comprising:
- storing, in a memory, a calibration table including an illumination intensity instruction value, a value of a current, and illumination intensity, obtained from the brightness of the measured image of the actually obtained image at an illumination intensity instruction value during creation of the part program;
- controlling a light emitting device to emit light at an article;
- controlling an imaging device to perform autofocusing on the article;
- determining exposure time per frame during the autofocusing;
- calculating a required illumination intensity based on the determined exposure time per frame; and
- calculating an illumination intensity instruction value corresponding to the required illumination intensity using the calibration table.

\* \* \* \* \*